(12) United States Patent
Kelly

(10) Patent No.: US 9,970,450 B1
(45) Date of Patent: May 15, 2018

(54) VENTED BEARING RETAINER FOR TURBOMACHINES

(71) Applicant: BorgWarner Inc., Auburn Hills, MI (US)

(72) Inventor: Allan Douglas Kelly, Hendersonville, NC (US)

(73) Assignee: BorgWarner Inc., Auburn Hills, MI (US)

( * ) Notice: Subject to any disclaimer, the term of this patent is extended or adjusted under 35 U.S.C. 154(b) by 0 days. days.

(21) Appl. No.: 15/417,178

(22) Filed: Jan. 26, 2017

(51) Int. Cl.
| | |
|---|---|
| *F16C 43/04* | (2006.01) |
| *F04D 29/059* | (2006.01) |
| *F04D 17/10* | (2006.01) |
| *F04D 29/28* | (2006.01) |
| *F04D 29/42* | (2006.01) |
| *F04D 29/053* | (2006.01) |
| *F04D 29/66* | (2006.01) |
| *F01D 5/04* | (2006.01) |
| *F01D 25/24* | (2006.01) |
| *F01D 25/16* | (2006.01) |

(52) U.S. Cl.
CPC .............. *F04D 29/059* (2013.01); *F01D 5/04* (2013.01); *F01D 25/164* (2013.01); *F01D 25/24* (2013.01); *F04D 17/10* (2013.01); *F04D 29/053* (2013.01); *F04D 29/284* (2013.01); *F04D 29/4206* (2013.01); *F04D 29/668* (2013.01); *F05D 2240/54* (2013.01); *F05D 2240/60* (2013.01)

(58) Field of Classification Search
CPC .. F01D 25/164; F04D 29/059; F05D 2240/54; F16C 27/04; F16C 27/066; F16C 33/6659; F16C 33/6681; F16C 35/077
See application file for complete search history.

(56) References Cited

U.S. PATENT DOCUMENTS

| | | | |
|---|---|---|---|
| 3,411,707 A | 11/1968 | Zoehfeld | |
| 3,466,478 A | 9/1969 | Gail | |
| 4,813,857 A | 3/1989 | Kawakami | |
| 6,966,646 B1 | 11/2005 | Cardenas et al. | |
| 7,337,764 B2 | 3/2008 | Pringle et al. | |
| 7,789,567 B2 | 9/2010 | Giesler et al. | |
| 2007/0086688 A1 | 4/2007 | Williams et al. | |
| 2011/0085753 A1 * | 4/2011 | Tecza .................... | F16C 27/066 384/462 |

FOREIGN PATENT DOCUMENTS

| | | | | |
|---|---|---|---|---|
| DE | 3146137 A1 * | 6/1983 | ............. | B65G 39/09 |
| DE | 102012223001 A1 * | 6/2014 | ............. | F16C 27/066 |
| EP | 1273764 A1 * | 1/2003 | ............. | F01D 25/164 |

* cited by examiner

Primary Examiner — Phillip A Johnson
(74) Attorney, Agent, or Firm — BrooksGroup

(57) ABSTRACT

Vented bearing retainer and roller bearings for turbomachines, such as compressors and turbines. Axial openings in, or adjacent to, the inner circumferential surface of the bearing retainer member equalize pressure differentials on the roller bearings. Axial grooves in the inner circumferential surface can be provided. Damper members on the OD of the retainer member can minimize rigid vibration modes and accommodate thermal growth and misalignment.

14 Claims, 3 Drawing Sheets

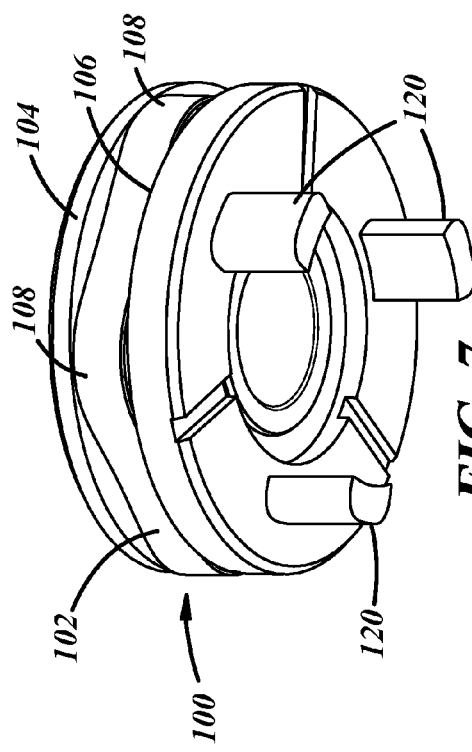
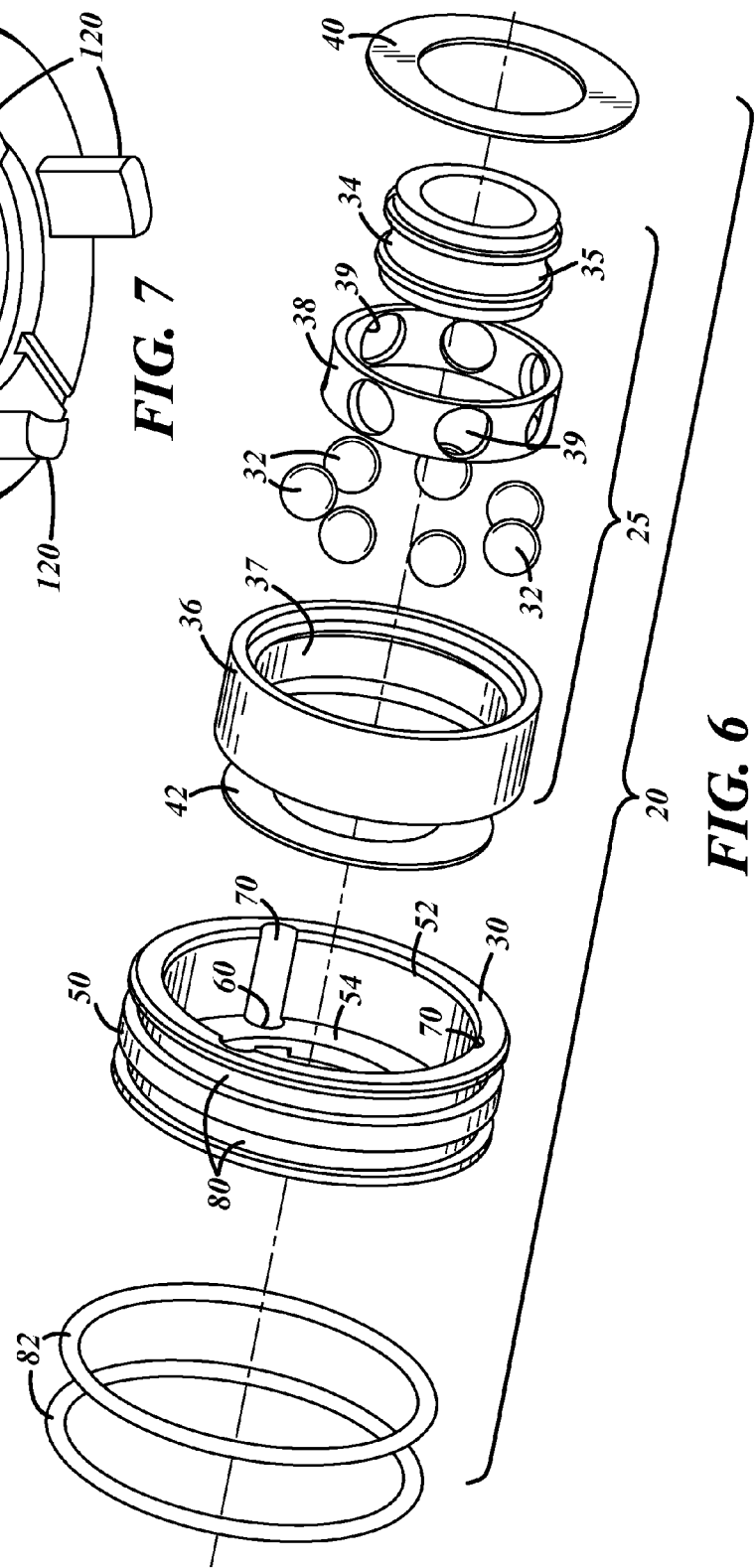

US 9,970,450 B1

VENTED BEARING RETAINER FOR TURBOMACHINES

TECHNICAL FIELD

The present invention relates to bearings for turbomachinery, and more particularly to retainers and assemblies for roller bearings.

BACKGROUND OF THE INVENTION

Turbomachines transfer energy between a rotor and a fluid, and include both turbines and compressors. A turbine transfers energy from a fluid to a rotor (impeller), while a compressor transfers energy from a rotor (impeller) to a fluid. In general, there are open and closed turbomachines. Open machines, such as propellers, windmills, and unshrouded fans act as an infinite extent of fluid, while closed machines operate on a finite quantity of fluid as it passes through a housing or casing. Turbomachines are also categorized according to whether they are axial flow machines or radial (centrifugal) flow machines.

Compressor turbomachines and turbine turbomachines typically include a rotating shaft located in a body or housing with an impeller at one end. Rotation of the shaft causes rotation of the impeller which in turn compresses or facilitates the flow of the fluid. Bearings, such as roller bearings, are provided to allow the shaft to rotate freely.

Correct lubrication is important to the performance and life of the bearings. For bearings which are permanently lubricated, it is also necessary to equalize pressure differentials that could force the lubricant from the bearings. Retainer members can be utilized to assist in preventing loss of lubricants from the bearings, as well as to prevent contaminants from entering the bearings, and decreasing their performance and durability.

With high speed turbomachines, it is also significant to prevent the outer races of the roller bearings or the bearing retainers from rotating at the same speed as the shaft and impeller, thereby increasing their duration and performance.

It thus is an object of the present invention to provide an improved retention member for a permanently lubricated bearing, and an assembly of a permanently lubricated bearing and an improved retention member, wherein retention of the lubrication is improved, as well as the durability and life of the assembly is improved. It is another object of the invention to provide an improved roller bearing and retainer assembly, as well as an improved retainer member for a roller bearing.

SUMMARY OF THE INVENTION

These and other objects are met by the present invention which provides an improved bearing retainer member and improved combination of such bearing retainer member with a bearing, such as a roller bearing. The bearing retainer member has one or more axial vents adjacent its inner circumferential surface. The vents equalize pressure differentials that could force lubricant from the bearing, such as past bearing side shields. In addition, one or more radial groove can be provided on the inner circumferential surface of the retainer member adjacent the axial vents. The radial grooves provide a bypass for gases that may develop near the roller bearing or assembly.

In order to provide damping and restrict rotation of the bearing retainer member in the housing, one or more damping members are provided on the exterior circumferential surface of the retainer member. The damping member can be a rubber or elastomeric ring member, such as an O-ring, or it can be a metallic compressible structural member that provides damping and frictional contact with the housing.

Other features of the invention, as well as other benefits and advantages, will become apparent from the following description of the invention in combination with the attached drawings and appended claims.

BRIEF DESCRIPTION OF THE DRAWINGS

FIG. 6 is an exploded view of the invention as depicted in FIGS. 3 and 4.

FIG. 7 depicts an alternate embodiment of the invention.

DETAILED DESCRIPTION OF THE PREFERRED EMBODIMENTS

The present invention in particular relates to permanently lubricated roller bearing mechanisms particularly for high speed turbomachines such as turbines generators or electric superchargers and will be described in that exemplary manner herein. However, the invention should not be limited to the use of the invention only for those situations and for those products. The turbomachines could support various impellers, including turbines, compressors, pumps, fans, and the like. The bearings also could be any type of standard bearings, such as ball bearings or roller bearings of various types, for example, cylindrical roller bearings, tapered roller bearings, spherical roller bearings, etc. The roller elements further could be arranged into one or more rows. The type of grease or lubrication utilized also could be any standard type, or newly compounded in the future.

The bearings also do not have to be types which are permanently lubricated. It could be bearings which have ports for replenishment of the lubrication. The grease or lubrication preferably should be of a sufficient type and amount to seal the bearing mechanism against solid and liquid contaminants, as well as moisture. The quantity of grease applied to the bearing is typically dependent on the application. An insufficient amount of grease could lead to metal-to-metal contact and premature bearing failure. Excessive amounts of grease could cause the operating temperature within the bearing to rise too rapidly. The amount of grease also can be dependent on the speed range for the bearing. A larger quantity of lubrication (up to 100% filled) is typically utilized for low speed applications, and a smaller quantity of lubrication (e.g. 30-50%) is typically utilized for medium to high speed applications.

Retainer members, such as end caps or end shields, also are utilized to retain the grease in the bearing and provide longer bearing life. The grease can be applied in the retainer or cap member and then the roller bearing can be assembled into or with the retainer member trapping as much of the grease as possible in the bearing-retainer assembly.

Further, although the use of a damping or softening member, such as O-rings or metal biasing force members, is preferred, such items may not be needed with certain embodiments of the retainer and bearing assembly. A soft mounting assembly is preferred because it can reduce or prevent rotation of the retainer member, allow axial travel, assure effective axial preload, and also lower the rigid vibration modes of the rotating assembly. Soft mounting assemblies further can better accommodate thermal growth and misalignment.

Figure 1:
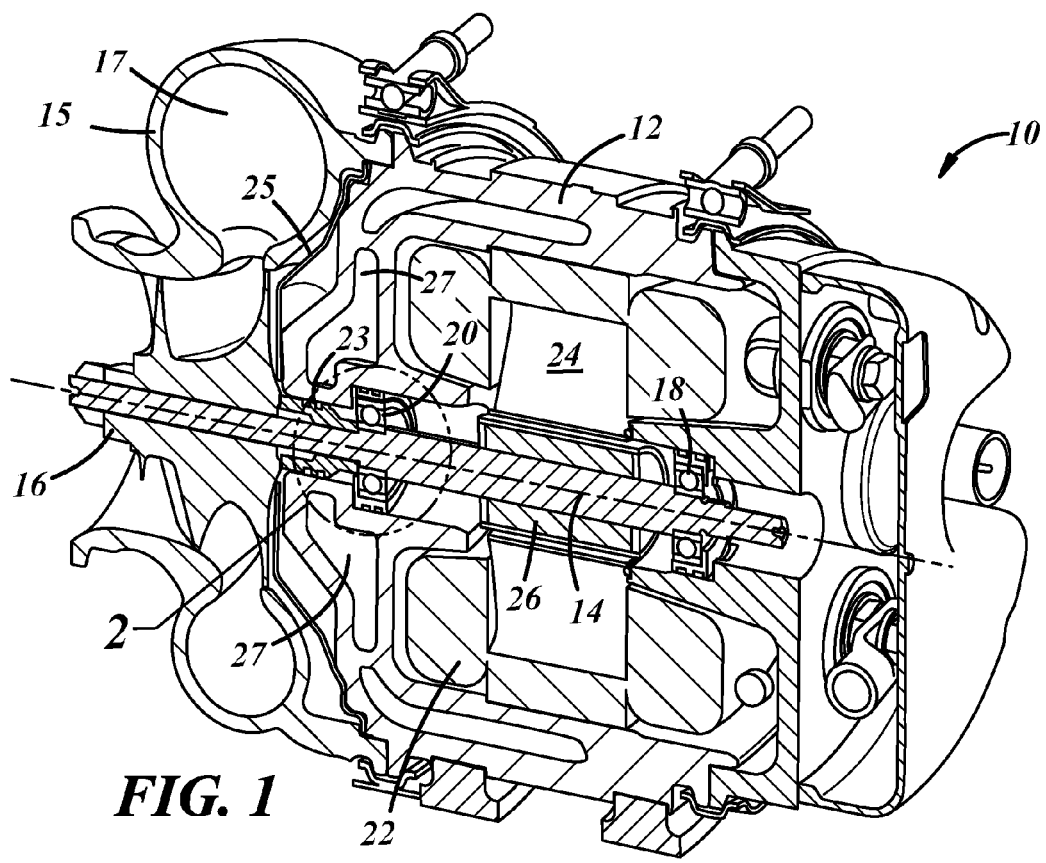
FIG. 1 is a perspective sectional view of a representative turbomachine utilizing the present invention.

Referring to FIG. 1, the present invention is shown being utilized in a representative turbine generator 10. The turbine has a housing 15, an internally mounted rotating shaft member 14, a fluid duct 17, and an impeller 16 attached at one end of the shaft member.

The shaft member 14 is rotatably mounted in the stator housing 12 by a pair of bearing assemblies 18 and 20. An electric motor 22 in the stator housing is used to generate electric power to rotate the shaft member. The motor has a stator member 24 which rotates a rotor member 26 which is fixedly attached to the shaft member 14. The turbomachine 10 also has a labyrinth seal 23, a heat shield 25, and coolant passages 27.

The bearing assemblies 18 and 20 can both be the same type of bearing or can be different types. The bearing assembly 20 will be described herein with respect to use of the preferred embodiment of the invention. The bearing 18 preferably is the same type and has the same components as the vented bearing assembly 20.

The inventive bearing assembly 20 is shown in FIGS. 2-6. The assembly 20 generally includes a bearing member 25 and a retainer member 30. In the embodiment shown, the bearing member is a roller bearing having a plurality of spherical ball members 32 positioned in a cage member 38. Although seven ball members 32 are illustrated, the number of ball members is not critical and can be any number utilized in roller bearings of this type.

The roller bearing assembly 20 includes an inner race member 34 and an outer race member 36, both of which have curved raceways 35 and 37, respectively, for the ball members. A ball holder member 36, also called a "cage," is positioned between the two race members and is used to hold the ball members in position and be spaced uniformly around the circumference of the bearing assembly. One of the ball members 32 is positioned in each of the openings 39 in the cage member 38.

Annular shield members 40 and 42 are positioned on the two axial sides of the two race members. The retainer members 40 and 42 assist in maintaining the lubricant inside the roller bearing member so that the bearing will perform satisfactorily.

The cap-type retainer member 30 is best shown in FIGS. 3-6. The retainer member 30 has an outer (OD) circular circumferential surface 50 and an inner (ID) circular circumferential surface 52. The retainer member 30 also has a radial annular flange member 54.

Preferably the retainer member 30 is made of a metal material, with suitable strength, thermal, magnetic and manufacturing properties, such as steel or aluminum materials. Similarly, the inner race member 34 and outer race member 36 are made of similar materials. The ball members 32 are preferably made of silicon nitride or suitable materials. A metal ball material, such as steel, may have limited use for high-speed electric turbomachines due to higher centrifugal forces, thermal expansion and electric conductivity. The holder member 38 is preferably made of a plastic or polymeric material.

A plurality of axial vent openings 60 are provided in the retainer member 30. The vent openings are provided adjacent the inner circumferential surface 52 of the retainer member 30, as more particularly shown in FIGS. 5 and 6. The vent openings are provided to equalize any pressure differentials that could force lubricant past the side shields 40 and 42 and out of the bearing member.

Preferably three vent openings 60 are provided, although the number could be less than or greater than that amount. The vent openings also are preferably uniformly spaced apart on the retainer members as shown in FIGS. 3-6. Spacing the vent openings uniformly can avoid distorting the outer race. The sizes of the vents are not critical so long as appropriate pressure differentials are equalized.

A plurality of grooves 70 are provided on the inner circumferential surface 52 of the retainer member 30. The grooves are preferably axial oriented. The depth of the grooves can be, for example, 10-80% of the thickness of the retainer member. The grooves are provided to allow any gases that may be formed in the turbine housing around the shaft member, or caused by the bearing assembly 20, to bypass and vent through the vent openings 60. Although three grooves 70 are shown in the drawings, the actual number can be greater than three or less than three. Preferably the number is the same as the number of vent openings for efficient removal of gasses and equalization of any pressure differentials, and preferably the grooves 70 align with, and are in communication with, the vent openings 60, as shown.

Figure 4:
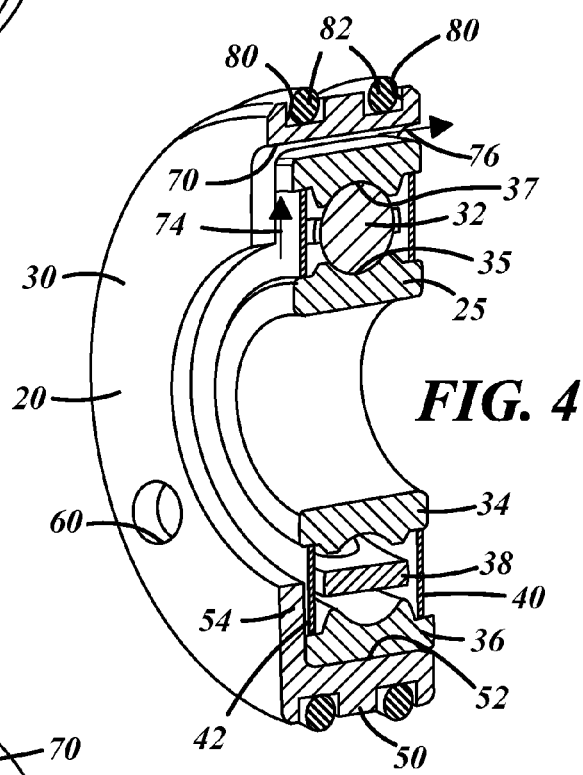
FIG. 4 is a cross-sectional view of the invention depicted in FIG. 3.

The radial bypass flow of gases from the bearing ID to the outer race of the bearing is shown by arrow 74 in FIG. 4. The axial grooves 70 provide bypass flow paths on the inner circumferential surface in the manner as shown by arrow 76 in FIG. 4.

Preferably, the vent openings 60 and grooves 70 are formed at the same time, and with the same machining or milling procedure. The vent openings and grooves could also be made by any other conventional forming operation, such as casting, sintering, metal injection molding, 3D printing, etc. They also can be formed from one axial side of the retainer member in one step. The geometry of the vent openings and grooves as shown in the drawings provide for this to be accomplished in this manner. This reduces the cost and time needed to manufacture the retainer member 30, as well as the complete bearing assembly 20.

Figure 5:
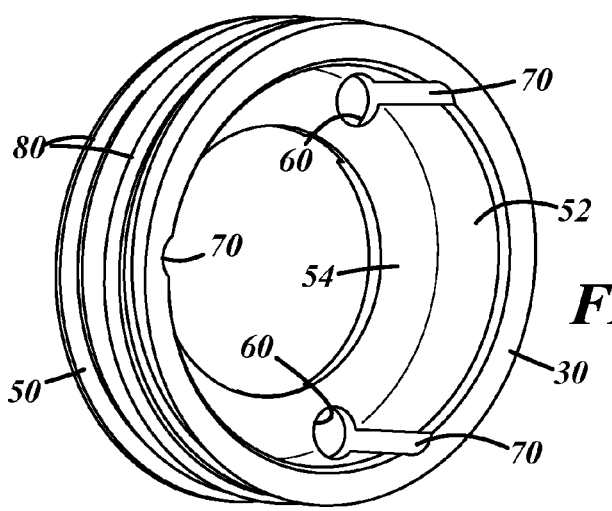
FIG. 5 is a perspective view of a bearing retainer member in accordance with the invention.

An embodiment of the invention where the vent openings 60 and grooves 70 can be made with a one-step machining operation is shown in FIGS. 5 and 6.

The vent openings through the flange wall 54 prevent the bearing pressure differential during high speed, high boost operation. The direct bearing vents 60 also assure equalized pressure under all conditions.

Figure 2:
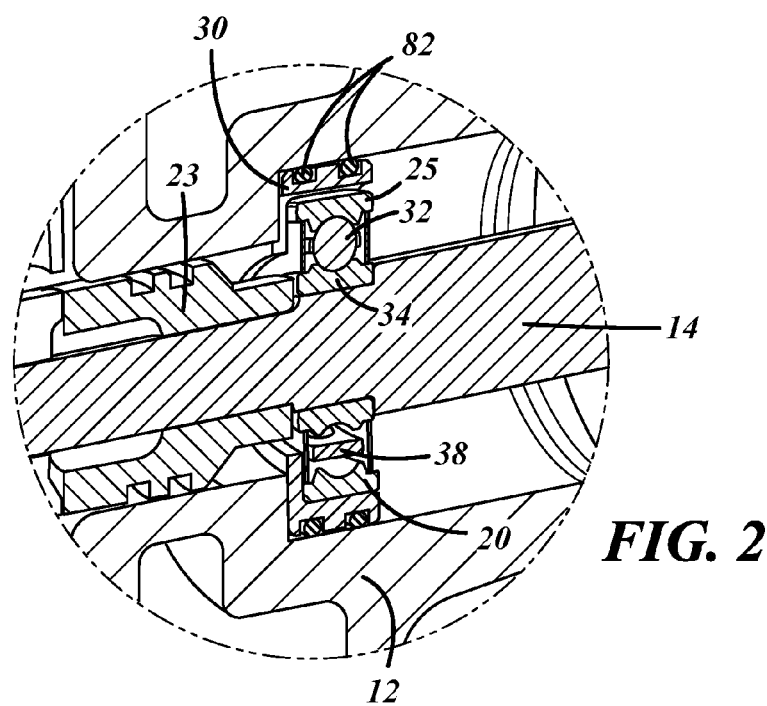
FIG. 2 is an exploded view of area 2 in FIG. 1.
Figure 3:
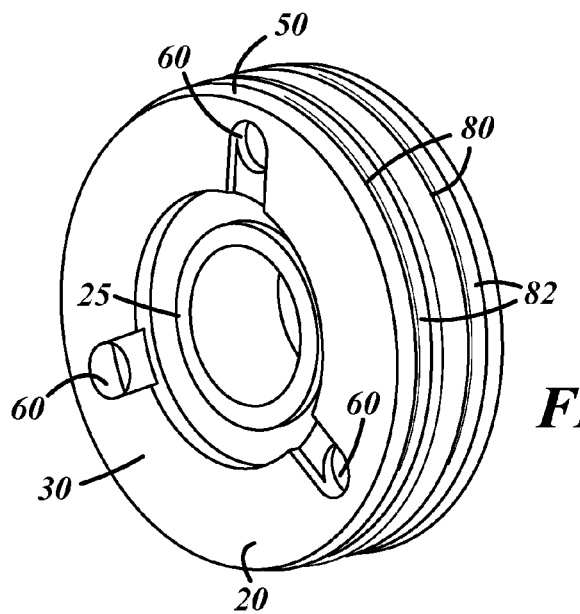
FIG. 3 is a perspective view of a combination of a roller bearing and bearing retention member in accordance with the invention.

In addition to the vent openings and grooves, the preferred bearing assembly also has a damping "soft" mounting feature. In one embodiment, one or more O-ring grooves 80 are positioned on the outer (OD) circumferential surface 50 of the retainer member 30. O-ring members 82 are positioned in the grooves 80 and extend slightly above the surface 50, as best shown in FIG. 4. A "soft" mounting of bearing assembly 20 in turbine housing 12 is shown in FIGS. 1 and 2.

When the roller bearing and retainer member assembly are installed in the housing, the O-rings provide a flexible mounting for the assembly in the turbomachine. The soft mounting provides a structural damping and lowers the speed that rigid modes of movement and vibration are encountered. The "soft" mounting also accommodates for any thermal growth and/or misalignment of the bearing assembly in the housing. The O-rings further provide friction with the housing and restrict the speed of rotation of the retainer member relative to the speed of the shaft member and roller bearing.

The O-rings 82 can be any conventional type of suitable chemical and temperature resistant elastomeric O-rings in use today. The O-rings positioned in the outer surface of the retainer member provide a floating mount of the bearing assembly 20 in the compressor housing 12.

An alternate embodiment 100 of the inventive bearing assembly is shown in FIG. 7. This embodiment 100 includes the same vent openings 60 and radial grooves 70 as the embodiment 10 discussed above, but has a different damping feature. Rather than utilize one or two O-rings in circumferential grooves, the embodiment 100 instead includes a metallic structural damper member 102 on the external circumferential surface 104 of the retainer member. The damper member 102 is preferably positioned in a circumferential groove 106 on the outer surface 104. The metallic damper member has a plurality of compliant portions or members 108 around its circumference that provide a biasing force on the housing. When the bearing assembly 100 is mounted or assembled in a housing, the biasing members 108 secure the bearing assembly in place and provide the same "soft" mounting as described above with respect to FIGS. 1-6. Preferably, the metallic damper member 102 includes an anti-rotation feature, such as members 120, to prevent the damper member from rotating. The bearing assembly also is allowed to slide axially on the shaft member and preferably provides a radial damping force.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. A bearing retainer member for use with a roller bearing, said bearing retainer member comprising:
   a circular axial extending annular wall member having an outer surface and an inner surface, and a radially extending wall flange member attached to said annular wall member,
   said wall flange member having at least one through-opening for passage of a gas therethrough, and
   at least one groove in said inner surface of said circular axial extending annular wall member.

2. The bearing retainer member as set forth in claim 1 wherein a plurality of through-openings are provided in said wall flange member.

3. The bearing retainer member as set forth in claim 1 wherein a plurality of grooves are provided in said inner surface of said circular axial extending wall member.

4. The bearing retainer member as described in claim 1 wherein said at least one through-opening and said at least one groove are substantially in axial alignment, wherein said through-opening and said groove is formed in a single machining operation.

5. The bearing retainer member as described in claim 1 further comprising at least one O-ring groove provided circumferentially on said outer surface.

6. The bearing retainer member as described in claim 5 wherein a pair of O-ring grooves are provided in said outer surface.

7. The bearing retainer member as described in claim 1 further comprising a metallic structural damper member provided circumferentially on said outer surface.

8. A roller bearing assembly comprising a roller bearing mechanism and a bearing retainer member, wherein said roller bearing mechanism comprises an inner race member, an outer race member and a plurality of roller members positioned between said inner and outer race members, and wherein said bearing retainer member comprises a circular axial extending annular wall member having an outer surface and an inner surface, and a radially extending wall flange member attached to said annular wall member, said wall flange member having at least one through-opening for passage of a gas therethrough, and at least one groove in said inner surface of said circular axial extending annular wall member, and wherein said roller bearing mechanism is mounted in said bearing retainer member, wherein pressure differentials between axial sides of said roller bearing assembly are equalized.

9. The roller bearing assembly as described in claim 8 wherein a plurality of through-openings are provided in said wall flange member.

10. The roller bearing assembly as described in claim 8 wherein a plurality of grooves are provided in said inner surface of said circular axial extending wall member.

11. The roller bearing assembly as described in claim 8 wherein said at least one through-opening and said at least one groove are substantially in axial alignment, wherein said through-opening and said groove is formed in a single machining operation.

12. The roller bearing assembly as described in claim 8 further comprising at least one O-ring groove provided circumferentially on said outer surface, and an O-ring positioned in said groove.

13. The roller bearing assembly as described in claim 12 wherein a pair of O-ring grooves are provided in said outer surface.

14. The roller bearing assembly as described in claim 8 further comprising a metallic structural damper member provided circumferentially on said outer surface.

* * * * *